Oct. 5, 1937.  M. H. DECKERT  2,095,173
HINGE STRUCTURE
Filed March 24, 1937
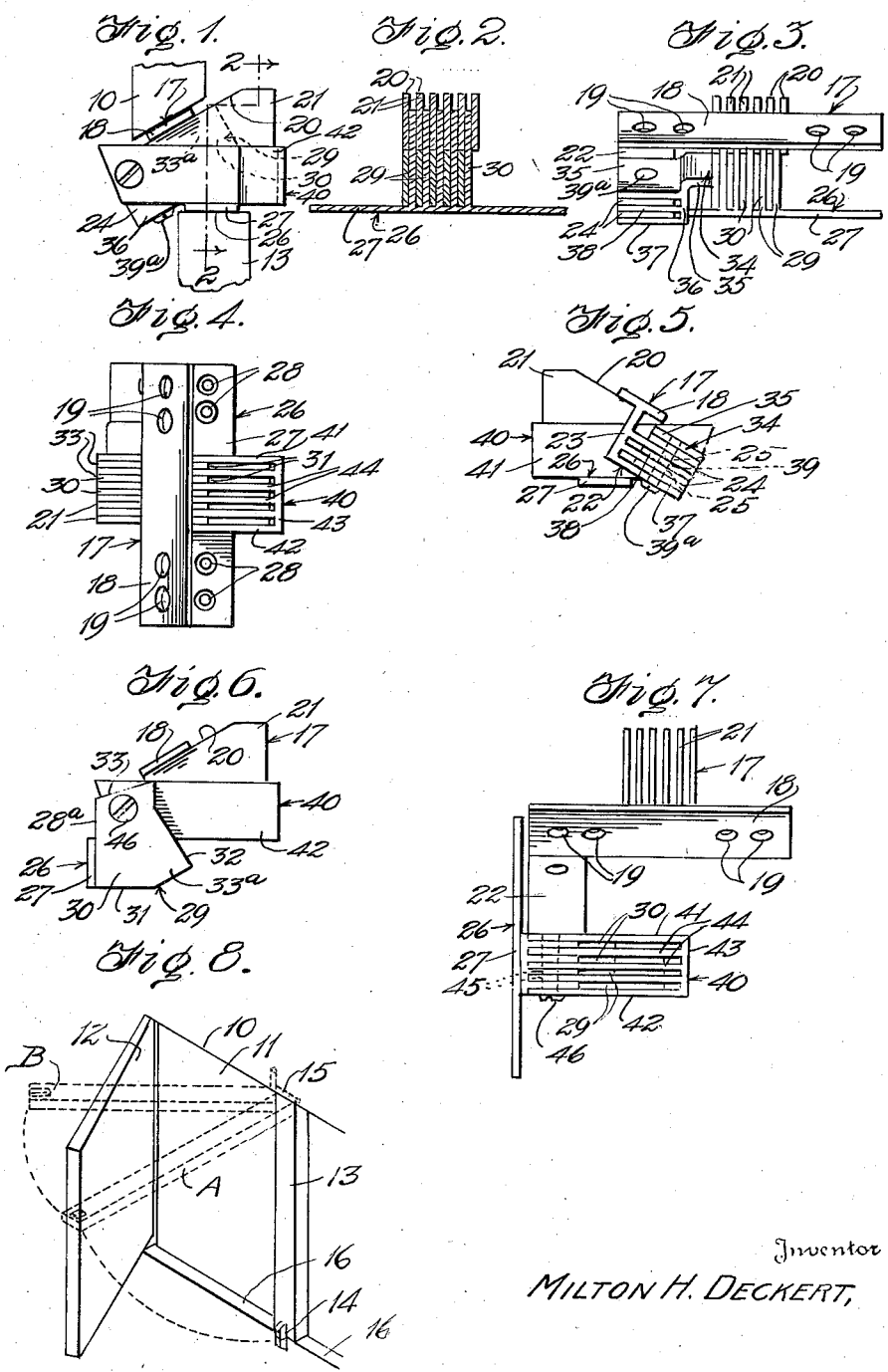
Inventor
MILTON H. DECKERT,
By Kimmel & Crowell,
Attorneys Patented Oct. 5, 1937

2,095,173

UNITED STATES PATENT OFFICE 2,095,173

HINGE STRUCTURE

Milton H. Deckert, Baltimore, Md.

Application March 24, 1937, Serial No. 132,859

9 Claims. (Cl. 16—162)

This invention relates to a hinge structure designed primarily for use in connection with the separating post between a pair of side doors of an automobile body of the sedan type, but it is to be understood that a hinge-structure, in accordance with this invention is to be employed in any connection for which it may be found applicable, and the invention has for its object to provide, in a manner as hereinafter set forth, a hinge structure which when correlated with the post aforesaid will permit of the adjusting of the latter to a position to enable the placing within and lengthwise of the automobile body an object, such as a cot, case, box, mattress, or stretcher, of a length materially greater than the width of a side door opening.

A further object of the invention is to provide, in a manner as hereinafter set forth, a normally latched, extendible hinge structure for the upper end of the separating post between a pair of side doors of an automobile and with said structure, when released and extended, permitting of the post being swung outwardly at an angle and then horizontally and upwardly to seat on the rear door of the pair, when the doors are open whereby the side of the automobile is open to an extent to permit of positioning the object aforesaid within and lengthwise of the automobile.

A further object of the invention is to provide, in a manner as hereinafter set forth, an extendible sectional normally latched hinge structure for the purpose referred to having coacting inherent parts thereof for latching it in non-extended position.

Further objects of the invention are to provide, in a manner as hereinafter set forth, a hinge structure for the purpose referred to which is simple in its construction and arrangement, strong, durable, readily adjustable, conveniently latched, thoroughly efficient in its use, and comparatively inexpensive to manufacture.

To the above ends essentially and to others which may hereinafter appear, the invention consists of such parts and such combination of parts as fall within the scope of the invention as claimed.

In the drawing:

Figure 1 is an elevation looking towards one side of the hinge structure and further illustrating in dotted lines a portion of the roof of an automobile body and a portion of the separating bar between a pair of side doors of the automobile body, Figure 2 is a section on line 2—2, Figure 1 with the roof and separating bar omitted, Figure 3 is a front elevation of a hinge structure, Figure 4 is a top plan view of a hinge structure, Figure 5 is an elevation looking towards the other side of the hinge structure, Figure 6 is a side elevation with the hinge structure partly extended, Figure 7 is a top plan view of the hinge structure when completely extended, and Figure 8 is a diagrammatical view illustrating the adjusted position in dotted lines of the separator bar.

With reference to Figure 5, that part of the top of the vehicle which provides the door openings in a side of an automobile body of the sedan type is indicated at 10, the opening for the rear side door at 11, the rear side door at 12, and the separating post between the side doors of the vehicle at 13. The forward side door is not shown. A latching means for the lower end of the post 13 is indicated at 14. The normally latched extendible hinged structure, in accordance with this invention is generally indicated at 15 and which is connected to the upper end of the post 13. When the side of the sedan is to be opened for the purpose aforesaid, the side doors are swung outwardly, the lower end of post 13 unlatched and swung outwardly at an angle relative to hinge structure 15 as indicated by the dotted line showing A and then the post 13 is swung horizontally to the dotted line position B to seat upon the top edge of the door 12. The hinge structure 15 includes a section which is anchored against the lower face of part 10 of the automobile body. The sill forming means for the side doors is indicated at 16. The post 13 is normally interposed between the part 10 and latched to the sill forming means 16 at 14.

The hinge structure 15 includes a stationary section 17 formed of a rectangular horizontally disposed bar 18 which is arranged at a downward inclination from its inner to its outer lengthwise edge. The bar 18 has spaced openings 19 for the passage of a holdfast means (not shown) for anchoring it to the part 10 of the body of the automobile. The lower face of the bar 18, intermediate the sides of the latter has formed integral with its lower face the inclined upper edges 20 of a series of spaced parallel upstanding aligned substantially triangular-shaped, rearwardly extending keepers 21 of like form disposed on their lower lengthwise straight edges. Centrally of one of the end terminal portions of the lower face of bar 18, the latter has formed integral therewith a depending downwardly inclined bracket 22 formed of an upstanding angle-shaped arm 23 inclining rearwardly from its top to its bottom and having formed integral with its front face a series of spaced parallel laminations 24 formed with aligned openings 25.

The hinge structure 15 includes an adjustable section 26 consisting of a rectangular plate 27 formed with openings 28 for the passage of holdfast means (not shown) to anchor plate 27 to the top edge of separator bar 13. The upper face of plate 27, centrally thereof is formed integral with the inner portion of the bottom edges 28$^a$ of a series of spaced parallel latching members 29 of like form and each consists of a plate 30 not only including the bottom edge 28$^a$, but also a rear edge 31, a top edge 32 and a front edge 33. The latter inclines forwardly from bottom edge 28$^a$ to top edge 32. The rear edge 31 has a straight portion and an inclined portion which extends at a forward inclination from the straight portion of edge 31 to the rear end of the top edge 32. The latter includes a straight portion which merges into the upper end of edge 33 and an inclined portion which extends from the straight portion thereof at an upward inclination to the upper end of edge 31. Each member 29 is so formed as to provide at its top a substantially triangular-shaped part 33$^a$ spaced from the front edge 33 of the member for taking between the stationary plates 21 for latching purposes.

The section 26 furthermore includes an angle-shaped arm 34, formed of an upper horizontal stretch 35, an intermediate vertically disposed stretch 36 and a horizontal lower stretch 37. The stretches 35, 37 extend respectively from the upper and lower ends of the stretch 36 and are disposed laterally in opposite directions with respect to the stretch 36 and extending in parallel planes. The arm 34 is disposed at a downward inclination from its rear to its outer side and is arranged substantially at right angles to the bracket 22. Formed integral with the outer face of the intermediate stretch of the arm 34 is a series of superposed spaced laminations 38 provided with openings 39. The laminations 38 are interposed between the laminations 24. The openings 39 align with the openings 25 in the bracket 22. The arm 34 is pivotally connected to the bracket 22 by a pivot in the form of an upstanding screw 39$^a$ inclining forwardly from its lower to its upper end and extending through the aligning openings 25, 39 and threadedly engaging with the upper lamination 35.

The section 26 has formed integral with the upper end of the arm 34 one side of a yoke-shaped member 40 which is disposed at right angles to and extends rearwardly with respect to arm 34. The member 40 is open at its forward end and includes a pair of sides 41, 42, a closed rear end 43, a series of equally spaced parallel sidewise opposed partitions 44 integral with the forward face of said rear end 43 and equally spaced from the said sides 41, 42. The sides of members 40, partitions 44 and members 29 have aligned openings 45 through which extend a pivot means 46 for and arranged in proximity to the outer ends of said members 29 and in proximity to the forward end of member 40. The latter and the arm 34 constitute a carrier for the members 29. The member 40 also functions as a guide for members 29. The means 45 is in the form of a screw having threaded engagement with the side 41 of member 40. The member 40 constitutes a guide for members 29 when these latter are shifted from and to latching position. The portions 33$^a$ are adapted to frictionally engage between and with keepers 21 for latching the hinge structure 15 in non-extended position. The interengaging of the portions 33$^a$ of members 29 with the keepers 21 prevent the rattling of bar 13 and sections of the hinge.

It will be assumed that the separator bar 13 is in the full line position (Figure 8), the latch 14 is released and the lower end of the bar is swung outwardly which in turn will move the member 29 downwardly to unlatch the section 26 from section 17 and section 26 will be in the position shown in Figure 4; then bar 43 is moved horizontally which in turn will swing section 26 to the position shown in Figure 7. Bar 13 is then moved upwardly to seat on door 12.

What I claim is:

1. A hinge structure for use in connection with automobiles of that type including an adustable normally vertically disposed separator bar for a pair of side doors, said hinge structure including a stationary section and an extendible section normally latched to the stationary section, said stationary section including keeper means, said extendible section including a shiftable carrier pivotally connected to said stationary section and a part shiftable relative to the carrier for anchoring to the upper end of said post, said part being pivoted to the carrier and including latching means coacting with said keeper means for latching the hinge structure in non-extended position, said part and carrier providing for the removal of the bar from normal position and permitting of the bar being adjusted outwardly and horizontally.

2. In a hinge structure for the purpose set forth, a stationary section adapted to be anchored to a support and including keeper means, an extendible section including shiftable pivotally suspended latching means coacting with said keeper means for normally latching said sections together normally in non-movable relation, said extendible section including a carrier for said latching means, said carrier being pivotally connected with said stationary section, and said extendible section having a part integral with said latching means adapted to be connected to the object to be hinged by said structure.

3. In a hinge structure for the purpose set forth, a stationary section adapted to be anchored to a support and including keeper means, an extendible section including shiftable pivotally suspended latching means coacting with said keeper means for normally latching said sections together normally in non-movable relation, said extendible section including a carrier for said latching means, said carrier being pivotally connected with said stationary section, said extendible section having a part integral with said latching means adapted to be connected to the object to be hinged by said structure, and said carrier including a guide for positioning under said keeper means for said latching means.

4. In a hinge structure for the purpose set forth, a stationary section adapted to be anchored to a support and including keeper means, an extendible section including shiftable pivotally suspended latching means coacting with said keeper means for normally latching said sections together normally in non-movable relation, said extendible section including a carrier for said latching means, said carrier being pivotally connected with said stationary section, said extendible section having a part integral with said latching means adapted to be connected to the object to be hinged by said structure, and said stationary section including a part integral with said keeper means for the passage of holdfast means to anchor such section in depending relation to a support.

5. In a hinge structure for the purpose set forth, a stationary section adapted to be anchored to a support and including keeper means, an extendible section including shiftable pivotally suspended latching means coacting with said keeper means for normally latching said sections together normally in non-movable relation, said extendible section including a carrier for said latching means, said carrier being pivotally connected with said stationary section, said extendible section having a part integral with said latching means adapted to be connected to the object to be hinged by said structure, said stationary section including a part integral with said keeper means for the passage of holdfast means to anchor such section in depending relation to a support, and said carrier including a guide for positioning under said keeper means for said latching means.

6. In a hinge structure for the purpose set forth, a stationary section adapted to be anchored to a support and including keeper means, an extendible section including shiftable pivotally suspended latching means coacting with said keeper means for normally latching said sections together in non-movable relation, said extendible section including a carrier for said latching means, said carrier being pivotally connected with said stationary section, said extendible section having a part integral with said latching means adapted to be connected to the object to be hinged by said structure, said keeper means being in the form of a series of spaced parallel sidewise opposed stationary keeper members, and said latching means being in the form of a series of spaced sidewise opposed latching members having extended portions for positioning between and for frictional engagement with said keeper members.

7. In a hinge structure for the purpose set forth, a stationary section adapted to be anchored to a support and including keeper means, an extendible section including shiftable pivotally suspended latching means coacting with said keeper means for normally latching said sections together in non-movable relation, said extendible section including a carrier for said latching means, said carrier being pivotally connected with said stationary section, said extendible section having a part integral with said latching means adapted to be connected to the object to be hinged by said structure, said keeper means being in the form of a series of spaced parallel sidewise opposed stationary keeper members, said latching means being in the form of a series of spaced sidewise opposed latching members having extended portions for positioning between and for frictional engagement with said keeper members, and said carrier including a combined holder and guide for said latching members.

8. In a hinge structure for the purpose set forth, a stationary section adapted to be anchored to a support and including keeper means, an extendible section including shiftable pivotally suspended latching means coacting with said keeper means for normally latching said sections together in non-movable relation, said extendible section including a carrier for said latching means, said carrier being pivotally connected with said stationary section, said extendible section having a part integral with said latching means adapted to be connected to the object to be hinged by said structure, said keeper means being in the form of a series of spaced parallel sidewise opposed stationary keeper members, said latching means being in the form of a series of spaced sidewise opposed latching members having extended portions for positioning between and for frictional engagement with said keeper members, and said carrier including a combined holder and guide for said latching members, said stationary section including a part integral with said keeper means for the passage of holdfast means to anchor such section in depending relation to a support.

9. In a hinge structure for the purpose set forth, a stationary section adapted to be anchored to a support and including keeper means, an extendible section including shiftable pivotally suspended latching means coacting with said keeper means for normally latching said sections together in non-movable relation, said extendible section including a carrier for said latching means, said carrier being pivotally connected with said stationary section, and said extendible section having a part integral with said latching means adapted to be connected to the object to be hinged by said structure, the pivot for said latching means being disposed at an angle to the pivot for the carrier.

MILTON H. DECKERT.